US011382271B2

(12) United States Patent
Birkhofer et al.

(10) Patent No.: US 11,382,271 B2
(45) Date of Patent: Jul. 12, 2022

(54) HARVESTING DEVICE WITH A CONICAL SCREW CONVEYOR

(71) Applicant: CLAAS Saulgau GmbH, Bad Saulgau (DE)

(72) Inventors: Stefan Birkhofer, Stockach (DE); Ulrich Boll, Bad Salgau (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 123 days.

(21) Appl. No.: 16/807,161

(22) Filed: Mar. 2, 2020

(65) Prior Publication Data

US 2020/0275610 A1 Sep. 3, 2020

(30) Foreign Application Priority Data

Feb. 28, 2019 (DE) .......................... 102019105168.1

(51) Int. Cl.
*A01D 61/00* (2006.01)
*A01D 34/66* (2006.01)

(52) U.S. Cl.
CPC .......... *A01D 61/004* (2013.01); *A01D 34/66* (2013.01); *A01D 61/002* (2013.01)

(58) Field of Classification Search
CPC .... A01D 61/004; A01D 61/002; A01D 34/66; A01D 75/02
See application file for complete search history.

(56) References Cited

U.S. PATENT DOCUMENTS

| 2,519,005 | A | | 8/1950 | Thompson et al. |
| 3,060,665 | A | | 10/1962 | Escher |
| 3,213,552 | A | * | 10/1965 | Vanvick ................. E01H 5/098 37/252 |
| 3,241,301 | A | | 3/1966 | Dyrdahl |
| 3,244,271 | A | * | 4/1966 | Wenning ............. A01D 61/004 198/669 |
| 3,509,699 | A | | 5/1970 | Calder |
| 5,305,586 | A | * | 4/1994 | Lundahl ................ A01D 34/53 56/14.4 |
| 5,588,494 | A | | 12/1996 | Pickett et al. |

(Continued)

FOREIGN PATENT DOCUMENTS

| CH | 212599 A | 12/1940 |
| DE | 102015002209 A1 | 8/2016 |
| EP | 1229779 A1 | 8/2002 |

(Continued)

*Primary Examiner* — Alicia Torres
*Assistant Examiner* — Matthew Ian Neal

(57) ABSTRACT

Harvesting device, having cutting members (14) for separating the crop material and/or having receiving members for collecting the crop material, having at least one transverse conveying device (19) for delivering the separated and/or collected crop material in a transverse conveying direction (20) running transversely to the harvesting direction, wherein the at least one transverse conveying device (19) is configured as a screw conveyor (21), comprising a trommel (22) and spiral conveying elements (23) sticking out from the trommel (22) in its radial direction. The respective screw conveyor (21) is conical or cone shaped, such that an envelope surface (24) of the spiral conveying elements (23) subtends a cone, which expands in conical or cone-shaped manner looking in the transverse conveying direction.

12 Claims, 3 Drawing Sheets

(56) References Cited

Figure 4:
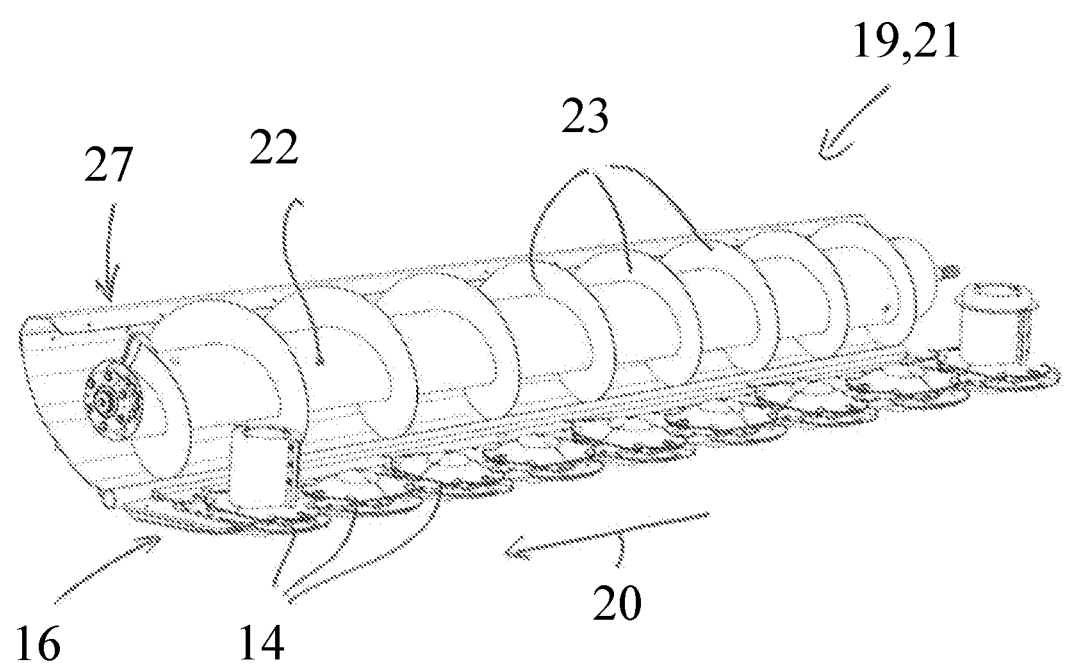

U.S. PATENT DOCUMENTS 7,621,113 B2 * 11/2009 Blakeslee ............ A01D 61/004
                                                           56/14.5
9,775,297 B2 * 10/2017 Ricketts .................. A01F 12/46

FOREIGN PATENT DOCUMENTS

WO      2012030763 A1    3/2012
WO      2014187618 A1    11/2014

* cited by examiner

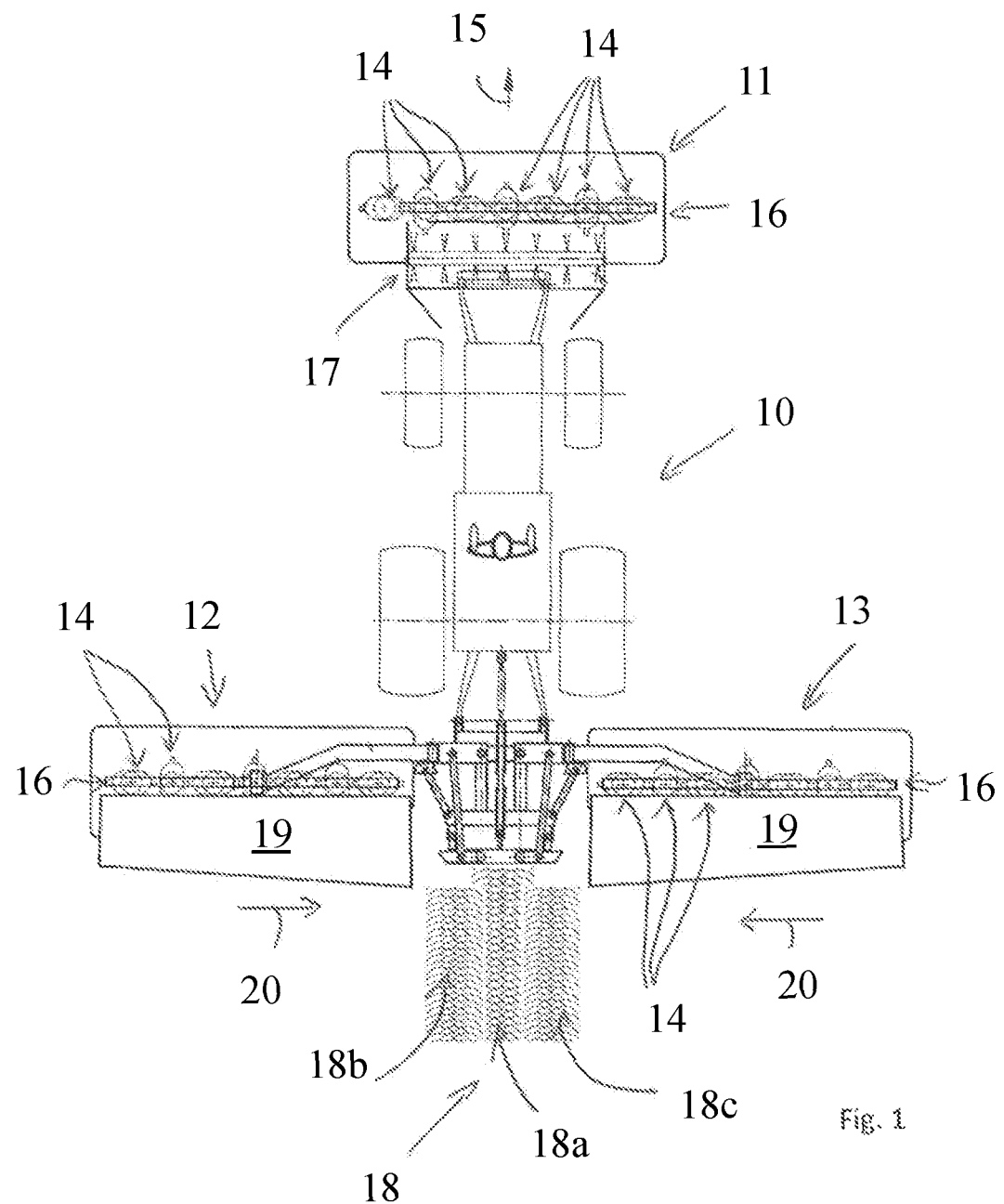

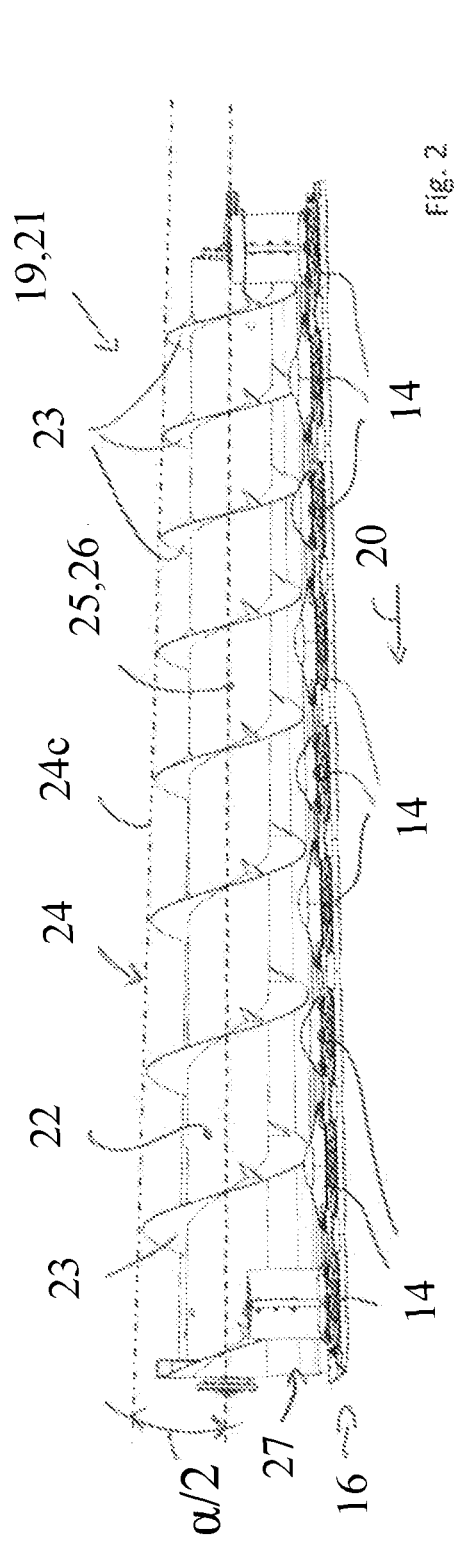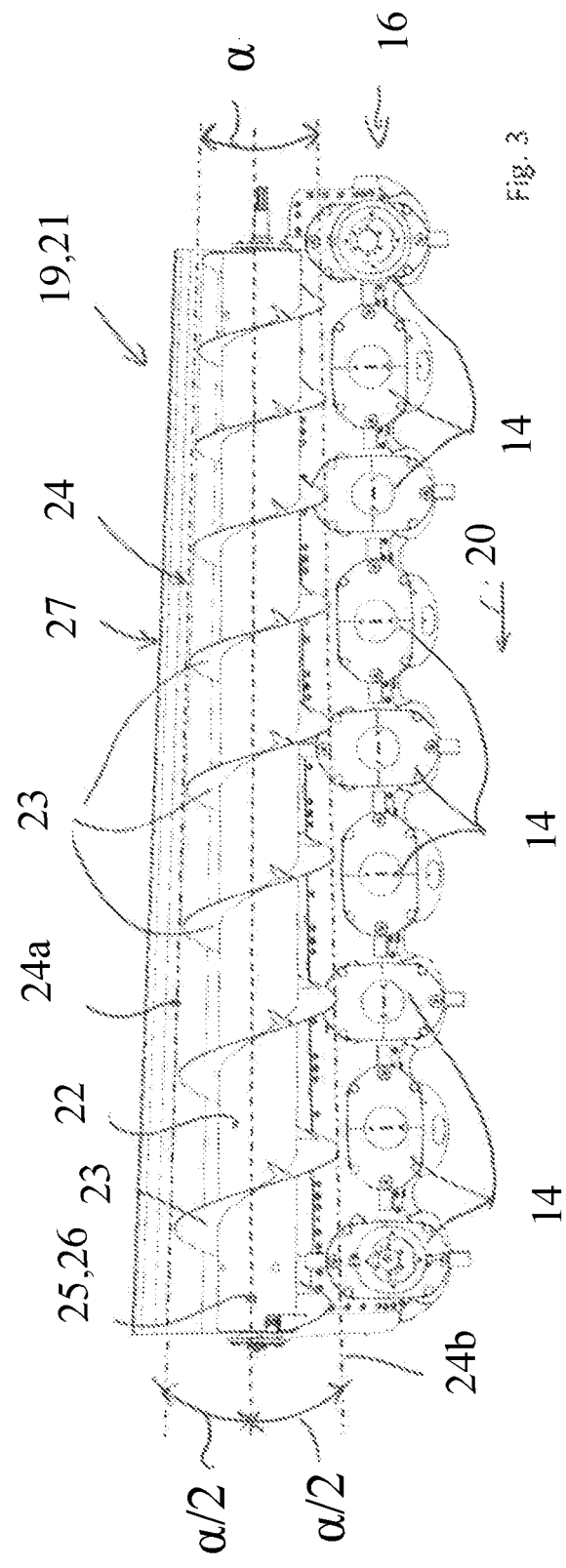

HARVESTING DEVICE WITH A CONICAL SCREW CONVEYOR

The invention relates to a harvesting device according to the preamble of claim 1.

The basic layout of a harvesting device, which serves for coupling to a tractor vehicle or carrier vehicle, is familiar to the skilled person being addressed here. Thus, a harvesting device comprises cutting members for the separating of crop material and/or receiving members for the collecting of crop material. When the harvesting device is a mowing unit, the cutting members are designed as mowing members. When the harvesting device is designed as a merger, it comprises only receiving members to gather up the already cut crop material.

Moreover, a harvesting device comprises at least one transverse conveying device for delivering the separated and/or collected crop material in a transverse conveying direction running transversely to the harvesting direction of the harvesting device. It is already known that the at least one transverse conveying device is configured as a screw conveyor. Such a screw conveyor comprises a trommel, also known as a worm tube. The trommel or the worm tube carries spiral conveying elements, which stick out in the radial direction of the trommel or worm tube from the trommel or worm tube and travel around it in spirals.

In the harvesting devices known in practice with such transverse conveying directions designed as a screw conveyor, the screw conveyors are cylindrical, that is, an envelope surface of the spiral conveying elements subtends a cylinder. A longitudinal central axis of the screw conveyor extends parallel to the transverse conveying direction, especially parallel to the cutting members or receiving members, which are positioned alongside each other in a row looking in the transverse conveying direction.

In the harvesting devices known in practice, the danger of a so-called clogging exists in the area of the transverse conveying device, with the danger increasing in the transverse conveying direction of the transverse conveying device. Clogs are also known as crop material clogs or crop material build-up. There is a need for a harvesting device in which the danger of such clogs is reduced.

Starting from this, the problem which the present invention proposes to solve is to create a new kind of harvesting device. This problem is solved by a harvesting device according to claim 1. According to the invention, the respective screw conveyor is conical or cone shaped, such that an envelope surface of the spiral conveying elements subtends a cone, which expands in the transverse conveying direction. When the respective screw conveyor is conical or cone shaped, as proposed, i.e., when the envelope surface of the spiral conveying elements subtends a cone, the risk of clogging during the crop material transport looking in the crop flow direction or in the transverse conveying direction of the crop material is reduced. Larger quantities of crop material can be transported with less danger of clogging.

According to one advantageous modification, a cone angle of the envelope surface is between 1° and 5°, preferably between 1° and 4°, especially preferably between 2° and 3°. Such a cone angle of the envelope surface of the spiral conveying elements of the respective screw conveyor is especially preferable and advantageous for transporting more crop material without danger of clogging.

According to one advantageous modification, a longitudinal central axis of the trommel, which coincides with a longitudinal central axis of the envelope surface, runs vertically slanting upward, looking in the transverse conveying direction and/or horizontally slanting backward. This is especially advantageous for transporting more crop material without danger of clogging. Thanks to the longitudinal central axis of the screw conveyor running vertically slanting upward, the discharge opening is located somewhat higher, so that the crop material is delivered upward and upon discharge it is laid down on a swath already formed by a front mowing unit. In this way, an advantageously uniform swath is formed. In horizontally running screw conveyors of the prior art, the crop material is shoved in laterally into an already formed swath, so that the additionally added crop material builds up in vertical orientation. This produces a disadvantageous nonuniform swath.

Preferably, the trommel, carrying the spiral conveying elements, is cylindrical. A cylindrically contoured trommel or a cylindrically contoured worm tube is preferable for transporting more crop material without danger of clogging.

Preferably, a gradient of the spiral conveying elements increases, looking in the transverse conveying direction. This is advantageous for transporting more crop material without danger of clogging.

The respective screw conveyor is arranged in a trough-like crop flow channel, which runs vertically upward at a slant and/or horizontally rearward at a slant, adapted to the screw conveyor looking in the transverse conveying direction. Such a crop flow channel is likewise preferable for transporting more crop material without danger of clogging.

Especially preferred is an embodiment of the crop flow channel in which the back wall of the crop flow channel— facing away from the cutting members—diverges from the envelope surface of the spiral conveying elements of the screw conveyor, looking in the transverse conveying direction. That is, the spacing of the back wall of the crop flow channel from the screw spirals increases in the transverse conveying direction, so that the crop flow channel has more capacity to hold crop material with increasing delivery distance. Especially preferably, the aperture angle between the envelope surface of the screw spirals and the back wall of the crop flow channel is around 1° (angle degrees).

Preferred modifications of the invention will emerge from the dependent Claims and the following specification. Exemplary embodiments of the invention are explained more closely with the aid of the drawing, without being limited to this. There are shown:

FIG. 1 a top view of an arrangement of a carrier vehicle and harvesting devices coupled to the carrier vehicle;

FIG. 2 a front view of a harvesting device according to the invention;

FIG. 3 a top view of the harvesting device of FIG. 2;

FIG. 4 a perspective view of the harvesting device of FIG. 2.

FIG. 1 shows a top view of an arrangement of a carrier vehicle 10 and harvesting devices 11, 12 and 13 coupled to the carrier vehicle 10. The harvesting devices 11, 12 and 13 in the exemplary embodiment of FIG. 1 are each mowing units, namely, a front mowing unit in the case of the harvesting device 11, which is coupled to the carrier vehicle 10 in front, and rear mowing units in the case of the harvesting devices 12, 13, which are coupled to the carrier vehicle 10 at the rear. Each of the harvesting devices 11, 12 and 13 shown in FIG. 1 and designed as mowing units has cutting members 14 for the separating of crop material, being designed as mowing members, wherein the cutting members 14 are positioned next to each other transversely to a harvesting direction 15, each forming a cutter bar 16, also known as a mowing bar.

In the region of the harvesting device 11 or the front mowing unit there is furthermore arranged a dresser 17, which serves for the preparation, especially the fragmentation, of the cut or separated crop material. Such a dresser may also be provided in the area of the harvesting device 12 and 13, configured as rear mowing units.

FIG. 1 furthermore shows a swath 18 of separated crop material, which has been placed on a ground surface being worked, this swath 18 being formed from partial swaths 18a, 18b and 18c. Thus, the harvesting device 11 produces the partial swath 18a, the harvesting device 12 produces the partial swath 18b, and the harvesting device 13 produces the partial swath 18c, which are combined to form the swath 18.

Especially in the region of the harvesting devices 12, 13 configured as rear mowing units in FIG. 1, transverse conveying devices 19 are provided which serve for the transport of the cut crop material transversely to the harvesting direction 15 in a transverse conveying direction 20, the respective transverse conveying direction being directed each time from outside to inside.

The transverse conveying devices 19 of harvesting devices are configured as a screw conveyor 21 in a harvesting device according to the invention, FIGS. 2 to 4 showing details of such transverse conveying devices 19 configured as a screw conveyor 21.

A transverse conveying device 19 configured as a screw conveyor 21 has a trommel 22, also known as a worm tube, as well as spiral conveying elements 23 sticking out from the trommel 22 in the radial direction of the trommel 22.

According to the invention, it is proposed that the respective screw conveyor 21 is conically configured, such that an envelope surface 24 of the spiral conveying elements 23 subtends a cone, which is defined by a cone angle $\alpha$. This cone angle $\alpha$ may also be called the aperture angle of the cone. The cone widens or opens up, looking in the transverse conveying direction.

FIGS. 2 and 3 show straight lines 24a, 24b and 24c, which lie on the envelope surface 24 of the spiral conveying elements 23 and make a respective half cone angle $\alpha/2$ with a longitudinal central axis 25 of the envelope surface.

Thanks to such a conically contoured screw conveyor 21, more crop material can be transported, looking in the transport direction 20, without the danger of clogging.

The cone angle $\alpha$ of the envelope surface 24 is preferably between 1° and 5°, preferably between 1° and 4°, especially preferably between 2° and 3°, especially 2.5°. Such an aperture angle $\alpha$ of the cone, which widens in the transverse conveying direction 20, is especially preferable for transporting more crop material without danger of clogging.

In the exemplary embodiment shown in FIGS. 2 and 3, the longitudinal central axis 25 of the envelope surface 24, which coincides with a longitudinal central axis 26 of the trommel 22 of the screw conveyor 21, runs at a slant looking in the transverse conveying direction 20, namely vertically slanting upward in FIG. 2 and horizontally slanting backward in FIG. 3, and by half the cone angle $\alpha/2$ in FIGS. 2 and 3. In this case, the envelope surface extends parallel to the cutting members 14 in front and below.

It is also possible for the longitudinal central axes 25, 26 to be slanting upward and backward by more than half the cone angle, once again in the transverse conveying direction. In this way, a so-called throwing angle of the transverse conveyor 19 can be optimized, in order to further reduce the danger of clogging during the transport of the crop material. Furthermore, thanks to a higher discharge height, the crop material delivered transversely is thrown or laid down from above onto a swath already formed by a front mowing unit. This produces an advantageously more uniform swath.

The trommel 22 of the transverse conveyor 19 designed as a screw conveyor 21 is preferably cylindrically contoured. However, it may also be conically contoured. The cylindrical contouring is preferred for providing more volume of the crop material being transported in the region of the screw conveyor 21, looking in the transverse conveying direction 20, and thus being able to transport more crop material without danger of clogging.

As already mentioned, the envelope surface 24 of the spiral conveying elements 23 is contoured conically, such that the cone and thus the envelope surface 24 diverges, looking in the transverse conveying direction 20, and thereby widens, which is accomplished in the case of a preferably cylindrically contoured trommel 22 by the fact that the radial extension of the spiral conveying elements 23 increases looking in the transverse conveying direction 20.

Preferably it is provided that the gradient of the spiral conveying elements 23 increases, looking in the transverse conveying direction 20, in order to accelerate the crop material more during its transport in the transverse conveying direction 20. By contrast with this, however, it is also possible for the gradient of the spiral conveying elements 23 to be constant, looking in the transverse conveying direction 20.

FIGS. 2, 3 and 4 furthermore show a trough-like crop flow channel 27, in which the screw conveyor 21 is arranged. This crop flow channel 27 is preferably inclined vertically upward at a slant and/or horizontally rearward at a slant, adapted to the screw conveyor 21, looking in the transverse conveying direction.

Furthermore, it is preferably provided that the respective crop flow channel 27 expands conically, looking in the transverse conveying direction, in order once again to provide more volume for the crop material being transported and thus to transport more crop material with less danger of clogging. In an especially preferred embodiment, the spacing of the back wall of the crop flow channel from the screw spirals or their envelope surfaces increases in the transverse conveying direction. The aperture angle between the envelope surfaces of the screw spirals and the back wall of the crop flow channel is especially preferably around 1° (angle degrees).

The harvesting device according to the invention may be a cutting unit or a mowing unit, being coupled either as a front attachment on a carrier vehicle or as a trailing apparatus behind a carrier vehicle. Moreover, the harvesting device according to the invention may be a so-called merger, which merely serves for collecting already cut or separated crop material and conveying it transversely in order to combine the crop material into a swath. When the harvesting device according to the invention is a cutting unit or mowing unit for frontal attachment to a carrier vehicle, it may also be designed as a direct cutting unit, the direct cutting unit being a front attachment for a forage harvester, fashioned as a cutting unit or mowing unit.

In such a direct cutting unit, it is possible to provide continuous trommel 22 across its width, being set with spiral conveying elements 23 feeding at both sides toward the middle in opposite direction. A divided trommel 22 can also be used, which is then connected by at least one joint, and then each of the trommels 22 is set with spiral conveying elements 23, as described above, in order to form a corresponding conically screw conveyor.

With the invention, crop material can be optimally transported with the aid of a screw conveyor 21, and this without the danger of a clog. The volume of the crop material being transported increases, looking in the crop flow direction or crop material transport direction, so that a larger mass of crop material can be transported safely without the danger of a clog. Thanks to the increasing outer diameter of the spiral conveying elements 23, the circumferential velocity of the conveying elements 23 increases, looking in the transport direction, and thus so does the delivery speed in the tangential direction. In this way, the crop material is hauled away more quickly at the downstream side, looking in the transverse conveying direction, where more crop material needs to be delivered. Since on the whole more delivery space is available for crop material, the screw conveyor 21 can be operated with a relatively low speed. This increases the operating efficiency of the harvesting device. As already explained, the gradient of the conveying elements 23 can be increased in the transverse conveying direction, so that an even more homogeneous transport of the crop material is possible while avoiding clogs or material build-up. A more homogeneous swath can be created thanks to the avoidance of clogs or material build-up.

The trommel 22 or worm tube of the screw conveyor are to be understood as the base body, which carries the conveying elements 23 and is not limited to being a hollow body, but it may also be massive or made of solid material.

LIST OF REFERENCE NUMBERS

10 Carrier vehicle
11 Harvesting device
12 Harvesting device
13 Harvesting device
14 Cutting member
15 Harvesting direction
16 Cutting bar
17 Dresser
18 Swath
18a Partial swath
18b Partial swath
18c Partial swath
19 Transverse conveying device
20 Transverse conveying direction
21 Screw conveyor
22 Trommel
23 Conveying element
24 Envelope
24a Straight line
24b Straight line
24c Straight line
25 Longitudinal central axis
26 Longitudinal central axis
27 Crop flow channel

The invention claimed is:

1. A harvesting device comprising:
cutting members (14) for separating the crop material and/or receiving members for collecting the crop material,
at least one transverse conveying device (19) for delivering the separated and/or collected crop material in a transverse conveying direction (20) running transversely to the harvesting direction (15),
wherein the at least one transverse conveying device (19) is configured as a screw conveyor (21), comprising a trommel (22) and spiral conveying elements (23) sticking out from the trommel (22) in its radial direction,
characterized in that
the respective screw conveyor (21) is conical or cone shaped, such that an envelope surface (24) of the spiral conveying elements (23) subtends a cone, which expands in conical or cone-shaped manner looking in the transverse conveying direction (20), wherein the screw conveyor (21) is arranged in a trough-like crop flow channel (27), which runs upward at a slant and/or rearward at a slant, adapted to the screw conveyor (21) in the transverse conveying direction (20) and the spacing of a back wall of the crop flow channel (27) diverges from the envelope surface (24) of the spiral conveying elements (23) looking in the transverse conveying direction (20).

2. The harvesting device according to claim 1, characterized in that a cone angle ($\alpha$) of the envelope surface (24) of the spiral conveying elements (23) is between 1° and 5°.

3. The harvesting device according to claim 2, characterized in that a longitudinal central axis (26) of the trommel (22) runs vertically slanting upward, looking in the transverse conveying direction (20).

4. The harvesting device according to claim 3, characterized in that the longitudinal central axis (26) of the trommel (22) slants upward by half the cone angle.

5. The harvesting device according to claim 3, characterized in that the longitudinal central axis (26) of the trommel (22) slants upward by more than half the cone angle.

6. The harvesting device according to claim 2, characterized in that a longitudinal central axis (26) of the trommel (22) slants backward horizontally, looking in the transverse conveying direction (20).

7. The harvesting device according to claim 6, characterized in that the longitudinal central axis (26) of the trommel (22) slants backward by half the cone angle.

8. The harvesting device according to claim 6, characterized in that the longitudinal central axis (26) of the trommel (22) slants backward by more than half the cone angle.

9. The harvesting device according to claim 1, characterized in that the trommel (22) carrying the spiral conveying elements (23) is cylindrical.

10. The harvesting device according to claim 1, characterized in that the trommel (22) carrying the spiral conveying elements (23) is conical.

11. The harvesting device according to claim 1, characterized in that a gradient of the spiral conveying elements (23) is constant, looking in the transverse conveying direction (20).

12. The harvesting device according to claim 1, characterized in that a gradient of the spiral conveying elements (23) increases, looking in the transverse conveying direction (20).

* * * * *